(12) United States Patent
Chiu (10) Patent No.: US 7,348,885 B2
(45) Date of Patent: *Mar. 25, 2008

(54) CAPACITIVELY-COUPLED RFID ENCODER

(75) Inventor: Lihu M. Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 11/207,222

(22) Filed: Aug. 19, 2005

(65) Prior Publication Data

US 2007/0040680 A1    Feb. 22, 2007

(51) Int. Cl.
*G08B 13/14* (2006.01)

(52) U.S. Cl. .............................. 340/572.1; 340/10.51; 235/451

(58) Field of Classification Search .. 340/572.1–572.9, 340/10.51, 10.52; 235/491, 449, 451
See application file for complete search history.

(56) References Cited

U.S. PATENT DOCUMENTS

| 4,990,891 A | * | 2/1991 | Reeb ........................ 340/572.5 |
| 7,051,945 B2 | * | 5/2006 | Empedocles et al. ........ 235/492 |

* cited by examiner

*Primary Examiner*—Phung T. Nguyen
(74) *Attorney, Agent, or Firm*—Jonathan W. Hallman; MacPherson Kwok Chen & Held LLP (57) ABSTRACT

In one embodiment, a capacitive encoding system is provided that includes a pair of capacitive elements formed from an arrangement of stripline conductors.

16 Claims, 10 Drawing Sheets

CAPACITIVELY-COUPLED RFID ENCODER

TECHNICAL FIELD

This invention relates to RFID applications. More particularly, the present invention relates to a capacitively-coupled RFID test system.

BACKGROUND

Radio Frequency Identification (RFID) systems represent the next step in automatic identification techniques started by the familiar bar code schemes. Whereas bar code systems require line-of-sight (LOS) contact between a scanner and the bar code being identified, RFID techniques do not require LOS contact. This is a critical distinction because bar code systems often need manual intervention to ensure LOS contact between a bar code label and the bar code scanner. In sharp contrast, RFID systems eliminate the need for manual alignment between an RFID tag and an RFID reader or interrogator, thereby keeping labor costs at a minimum. In addition, bar code labels can become soiled in transit, rendering them unreadable. Because RFID tags are read using RF transmissions instead of optical transmissions, such soiling need not render RFID tags unreadable. Moreover, RFID tags may be written to in write-once or write-many fashions whereas once a bar code label has been printed further modifications are impossible. These advantages of RFID systems have resulted in the rapid growth of this technology despite the higher costs of RFID tags as compared to a printed bar code label.

Generally, in an RFID system, an RFID tag includes a transponder and a tag antenna, which communicates with an RFID transceiver pursuant to the receipt of a signal, such as an interrogation or encoding signal, from the RFID interrogator. The signal causes the RFID transponder to emit via the tag antenna a signal, such as an identification or encoding verification signal, that is received by the RFID interrogator. In passive RFID systems, the RFID tag has no power source of its own and therefore the interrogation signal from the RFID interrogator also provides operating power to the RFID tag.

Currently, a commonly used method for encoding the RFID tags is by way of an inductively coupled antenna comprising a pair of inductors or transmission lines placed in proximity of the RFID transponder to provide operating power and encoding signals to the RFID transponder by way of magnetic coupling. Magnetic coupling, however, is not without shortcomings. Magnetic coupling generally depends on the geometry of the RFID tag, such as the shape of the tag antenna, transponder, etc, so an often complex process for determining an optimal alignment of transceiver with the RFID tag is necessary for effectively directing the magnetic field between the transceiver and the RFID tag such that their magnetic fields would couple. Furthermore, this process has to be redone if the transceiver is be used for encoding an RFID tag of a different geometry, due to a different shape or a different orientation with respect to the pair of inductors when placed in proximity of the RFID transponder.

An attractive alternative to magnetically-coupled RFID encoding schemes are capacitively-coupled RFID encoders. For example, U.S. Ser. No. 11/073,042 (the '042 application) filed Mar. 4, 2005 describes a capacitively-coupled RFID encoder. Unlike conventional near-field capacitively-coupled encoders, the encoder described in the '042 application requires no modification to the encoded tag. In contrast, conventional near-field techniques typically require the RFID tag antenna to be modified with capacitive plates. However, the '042 application describes an electromagnetic modeling technique to determine areas of relatively high current when a conventional RFID antenna such as a dipole antenna is excited by RF energy.

The encoder disclosed in the '042 application exploits these areas of relatively high current by providing matching capacitive elements in the encoder. These capacitive elements are selected to be proximate the high current areas. Thus, when the capacitive elements are excited by an RF encoding signal, the adjacent RFID tag antenna will respond to this capacitive excitation.

Despite the advances disclosed in the '042 application, there remain unfulfilled needs in the art. For example, a user of a capacitive encoder often desires to know whether the RFID tag being capacitively encoded is operative. Accordingly, there is a need in the art for an improved capacitively-coupled RFID transponder test system.

SUMMARY

In accordance with an aspect of the invention, a stripline capacitive RFID tag encoder includes: a substrate; a first plurality of serially-connected stripline conductors on a surface of the substrate, the serially-connected stripline conductors in the first plurality being arranged within a first area of the surface, a second plurality of serially-connected stripline conductors on the surface of the substrate, the serially-connected stripline conductors in the second plurality being arranged within a second area of the surface, the encoder being configured to drive the first plurality of serially-connected stripline conductors with an RF signal and to drive the second plurality of serially-connected stripline conductors with a phase-shifted version of the RF signal.

In accordance with another aspect of the invention, a capacitive RFID tag encoder includes: a substrate; and a plurality of capacitive elements on the substrate, each capacitive element including a plurality of serially-connected stripline conductors, the encoder being configured to drive a first selected one of the capacitive elements with an RF signal and to drive a second selected one of the capacitive elements with a phase-shifted version of the RF signal.

BRIEF DESCRIPTION OF THE DRAWINGS

FIG. 8b is a cross-sectional view of the encoder of FIG. 8a.

DETAILED DESCRIPTION

Figure 1:
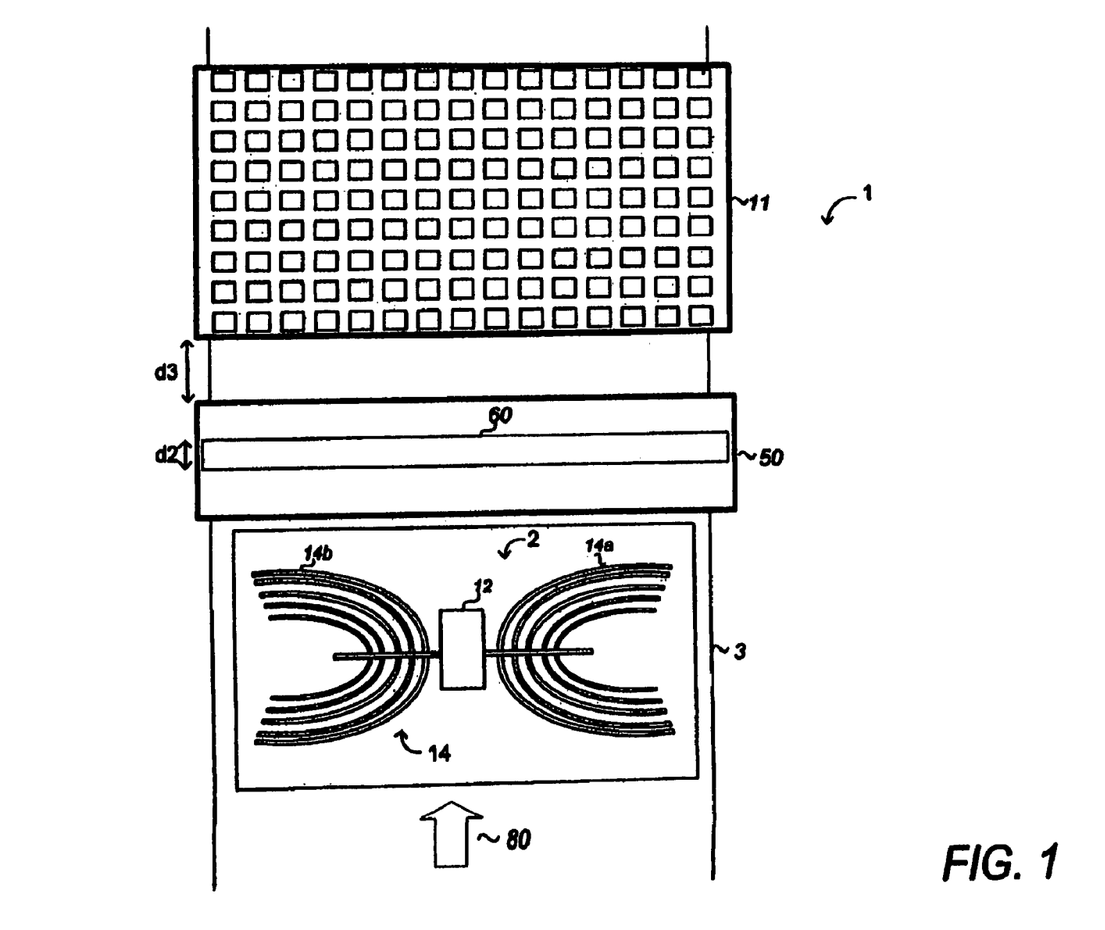
FIG. 1 illustrates an exemplary system including an imager and a capacitive encoder for communication with an REID tag in accordance with an embodiment of the invention.

With reference to FIG. 1, an exemplary system 1 is shown that includes an RFID tag imager 50 and a capacitive encoder 11. As known in the art, RFID tags such as an RFID tag 2 are typically provided on a roll 3. Roll 3 includes a backing such as paper or plastic on which the RFID tags are temporarily affixed using tape or similar means. System 1 may be integrated with a bar code printer (not illustrated) such that as goods are processed, system 1 encodes an RFID tag 2 from the roll, affixes the RFID tag 2 to the package, and also prints a corresponding bar code label for the package. As additional packages or goods are processed, additional RFID tags (not shown) are fed to system 1 from the roll in direction 80.

Figure 2A:
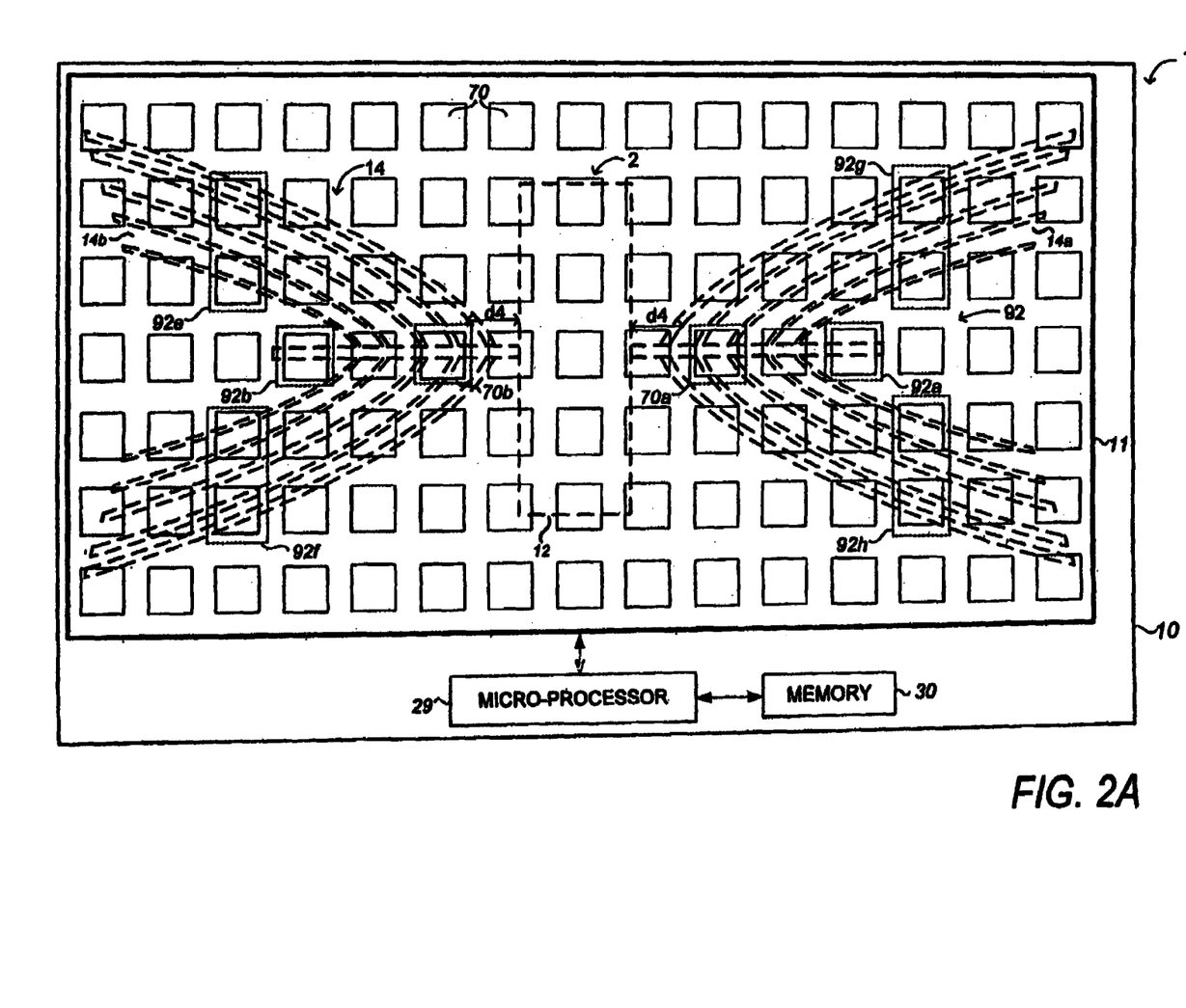
FIGS. 2A-B illustrate the capacitive encoder of FIG. 1 encoding an RFID tag in accordance with embodiments of the invention.

RFID tag 2 includes a transponder 12 and a tag antenna 14 such as a patch antenna or a dipole antenna. In the exemplary embodiment shown in FIG. 1, tag antenna 14 is a dipole antenna having antenna wings 14a and 14b. As will be described further herein with respect to FIG. 2A and FIG. 2B, capacitive encoder 11 includes a plurality of elements such as conductive plates 70 that may be selectively excited so as to encode RFID tag 2. In FIG. 2A, the RFID tag 2 (shown in phantom) has been moved adjacent to capacitive encoder 11 such that if elements 70a and 70b are excited with a signal within the operating bandwidth of the RFID tag 2, the RFID tag 2 may be encoded (or alternatively, may be read). The selection of which elements 70 within the array that should encode the RFID tag 2, however, depends upon the topology of the tag antenna 14. Advantageously, system 1 needs no prior knowledge of the antenna topology. In that regard, an operator of system 1 need not be concerned with configuring system 1 responsive to the particular RFID tag being encoded.

To determine which plates 70 should be selected for excitation, system 1 may first image the tag antenna 14 using RFID tag imager 50. For example, RFID tag imager 50 may image tag antenna 14 in successive portions 60 of width $d_2$ as shown in FIG. 1. In that regard, roll 3 upon which the RFID tag 2 is mounted could be drawn through system 1 at either a constant or changing rate. As the RFID tag 2 passes by imager subsystem 50, the data from the successive portions being imaged are captured and processed by a microprocessor 29 shown in FIG. 2A. Microprocessor 29 processes the resulting data to form a complete image of the tag antenna 14. Based upon this image, microprocessor 29 may then run an electromagnetic modeling algorithm such as a finite element analysis/method of moments algorithm to determine the areas of greatest surface currents within antenna 14 in response to an excitation. For example, with respect to dipole wings 14a and 14b, an area of maximum current excitation would be similarly located within each dipole half. Capacitive encoder 11 may then excite at least one capacitive element 70 corresponding to each area of maximum current excitation. For example, with respect to dipole half 14b, capacitive element 70b may be considered to be most closely positioned with the area of maximum current excitation. Similarly, capacitive element 70a may be considered to be most closely positioned with the area of maximum current excitation in dipole half 14a. The determination of when to excite elements 70a and 70b will depend upon the rate of progress for the RFID tag 2 with respect to system 1 as well as the distance $d_3$ between imager subsystem 50 and capacitive encoder 11. It will be appreciated that the selection of a single element for each dipole half is for illustration purposes only—depending upon the antenna topology, more than one element 70 for each area of maximum current excitation may be necessary.

Figure 2B:
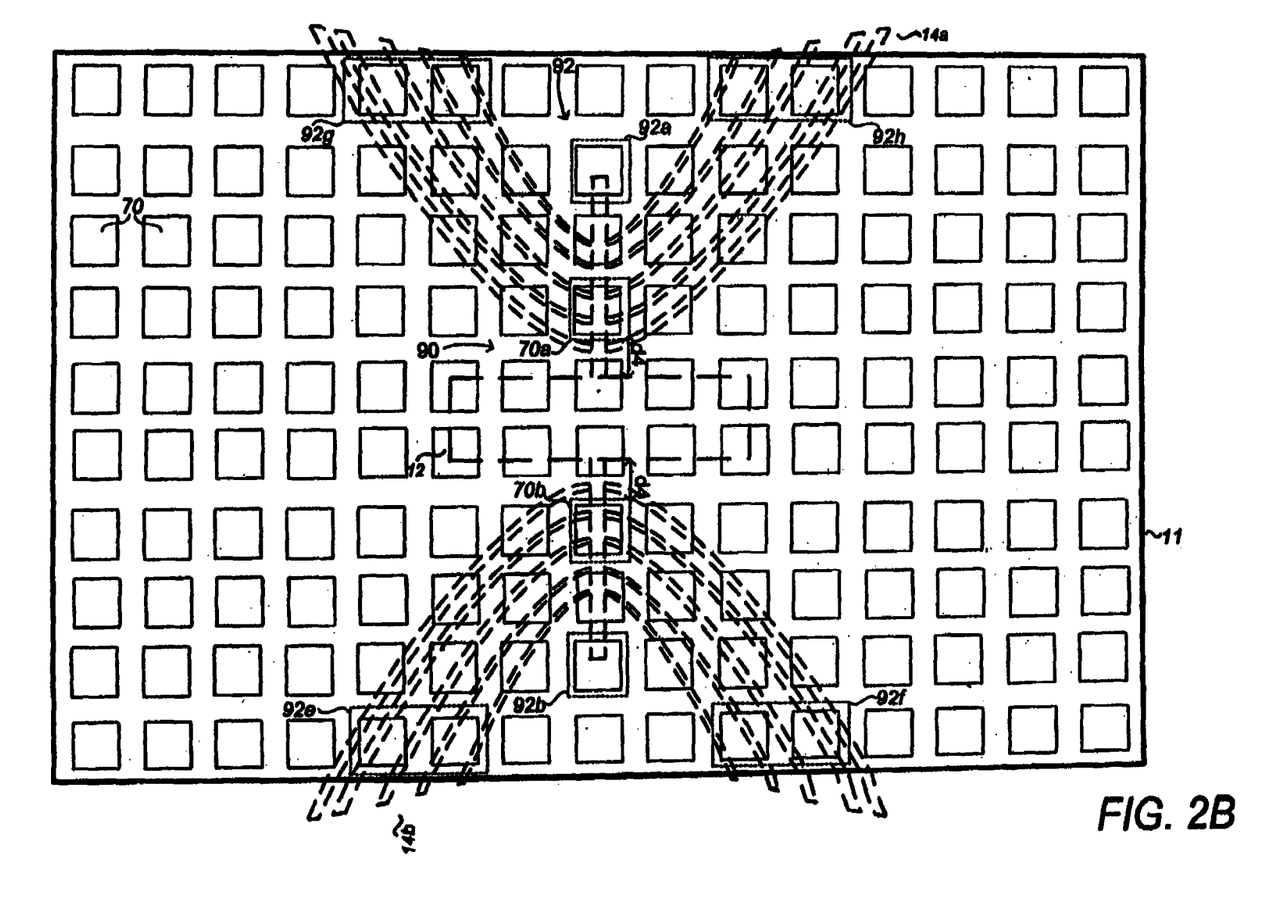

Consider the advantages of system 1: Regardless of the orientation and topology of the tag antenna 14, system 1 may image the tag antenna 14, model its electromagnetic properties based upon the imaging to determine maximum current excitation areas, and select elements 70 accordingly to properly encode the RFID tag 2. Thus, should the RFID tag 2 be oriented differently such as being rotated approximately 90 degrees on roll 3 as shown in FIG. 2B, capacitive encoder 11 may still make a proper selection of a subset of elements 70 for encoding of the RFID tag 2. Thus, based upon data from RFID tag imager 50, processor 29 will select elements 70a and 70b as discussed with respect to FIG. 2A. As seen in FIG. 2B, however, the locations of elements 70a and 70b have changed corresponding to the new orientation of the tag antenna 14. As compared to an RFID encoder that uses magnetic coupling, the power dissipation in system 1 is substantially reduced in that the ohmic loss through elements 70 is insubstantial compared to that which occurs in the transmission lines used to establish magnetic coupling.

In another exemplary embodiment, RFID tag imager 50 may include an optics subsystem (not shown) comprising a light source, such as a lamp, to illuminate the RFID tag 2 with illuminating radiations in the visible spectrum, such as visible light, and optical lens for receiving the reflected visible light from the RFID tag 2.

Because of the electromagnetic modeling performed by processor 29, capacitive encoder 11 may perform other operations on the RFID tag 2 besides either encoding or interrogating. For example, based upon modeling the currents excited in the tag antenna 14, processor 29 may determine the radiated fields from the tag antenna 14 that would be excited by the encoding or interrogating signals driven to elements 70a and 70b. Because the RFID tags may be affixed to roll 3 as discussed previously, the radiation from one RFID tag may affect adjacent RFID tags. As the sensitivity of RFID tags is increased, the received radiation in the adjacent tags may be such that these tags are also encoded by capacitive encoder 11. To prevent such stray radiation and undesired encoding of adjacent RFID tags, processor 29 may select subsets 92 of elements 70 to be excited with a signal that will nullify any radiation from the encoded RFID tag 2. For example, with respect to dipole half 14a, a subset 92a consisting of just one element may be selected to be driven with a nullifying signal. Alternatively, depending upon the desired nullifying effect, subsets 92g or 92h may be selected. Similarly, with respect to dipole half 14b, subsets 92b, 92e, and 92f represent exemplary element selections for a nullifying signal excitation.

In embodiments in which capacitive encoder 11 not only encodes or interrogates but also nullifies electromagnetic radiation from the excited RFID tag 2, a total of four signals should be available to drive any given element 70. For example, suppose an element 70 is selected for the encoding signal. Depending upon which dipole half the selected element 70 corresponds to, the element may be driven with a signal to capacitively encode RFID tag 2. For example, with respect to FIG. 2B, element 70a could be driven with this signal whereas element 70b may be driven with the same signal shifted in phase by 180 degrees. These two signals may be denoted as A and A*.

In general, signals A and A* need merely be out of phase by some appreciable amount. For example, it may readily be seen that if signals A and A* are completely in phase, no excitation of RFID tag 2 will ensue. As A* is shifted out of phase with respect to A, a greater and greater amount of excitation may ensue. For example, if A* is shifted in phase by 135 degrees with respect to A, the excitation power will be approximately 70 percent of the maximum achievable power, which corresponds to a phase shift of 180 degrees.

Figure 3:
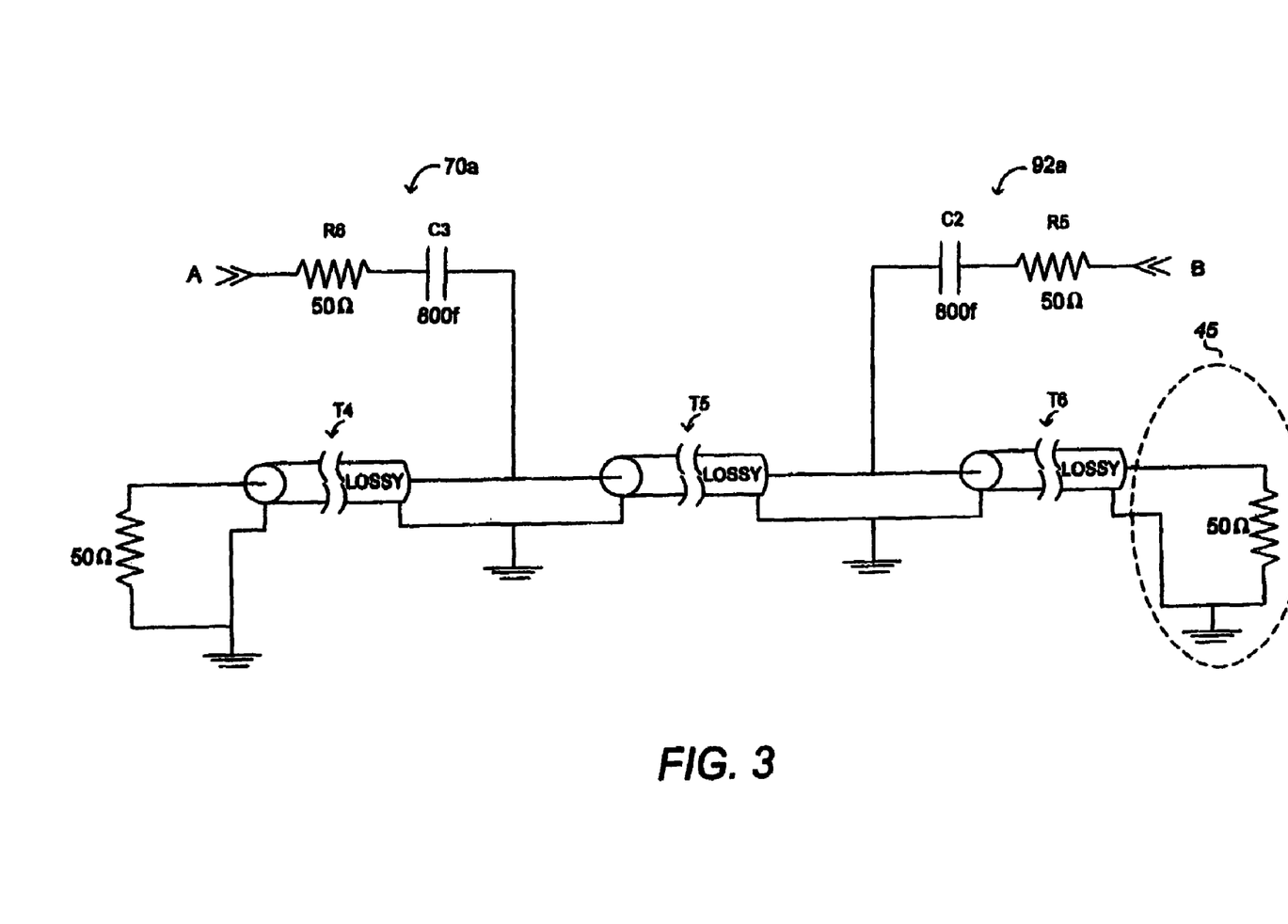
FIG. 3 is a schematic illustration of a simplified electromagnetic model for an RFID tag antenna, wherein the antenna is excited with both an encoding signal A and a nullifying signal B.

Regardless of the phase relationship between signals A and A*, processor 29 may calculate a nullifying signal that will have some phase and power relationship to signal A. This nullifying signal may be represented as signal B. For example, suppose that after imaging and electromagnetic modeling of RFID tag antenna 14, processor 29 simplifies the resulting electromagnetic model as seen in FIG. 3. In this model, the electrical properties of the tag antenna 14 are represented by lossy transmission line portions T4, T5, and T6. These lines would have some characteristic impedance that would depend upon the electrical properties of the tag antenna 14. The input to T4 would be the excitation point from transponder 12 (FIG. 1). The output of T6 represents the field at the "end" of the tag antenna half 14a. The actual location of the end of T6 depends upon the RFID tag orientation on roll 3. For example, as seen in FIG. 2A, the RFID tags may be orientated in a side-to-side fashion whereas as seen in FIG. 2B, the RFID tags may be oriented in an end-to-end fashion. It will be appreciated that the field between adjacent RFID tags is the field of primary concern. Thus, the end of T6 represents the location of this field.

Regardless of whether the orientation is of the RFID tag 2 is side-to-side, end-to-end, or some other arrangement, the electrical model shown in FIG. 3 may be used to represent the radiation between adjacent RFID tags. In this model, the capacitive elements 70 are also modeled. Element 70a is represented by resistor R6 and capacitor C3. Similarly, element 92a is represented by resistor R5 and capacitor C2. Based upon this electromagnetic model, the relationship between nullifying signal B and encoding signal A may be derived such that no fields are excited in region 45, at the end of transmission line T6. Analogous calculations may be performed to derive a nullifying signal B* for encoding signal A*. A bus structure to support the feed and selection of signals A, A*, B, and B* to each capacitive element will now be discussed.

Figures 4A, 4B:
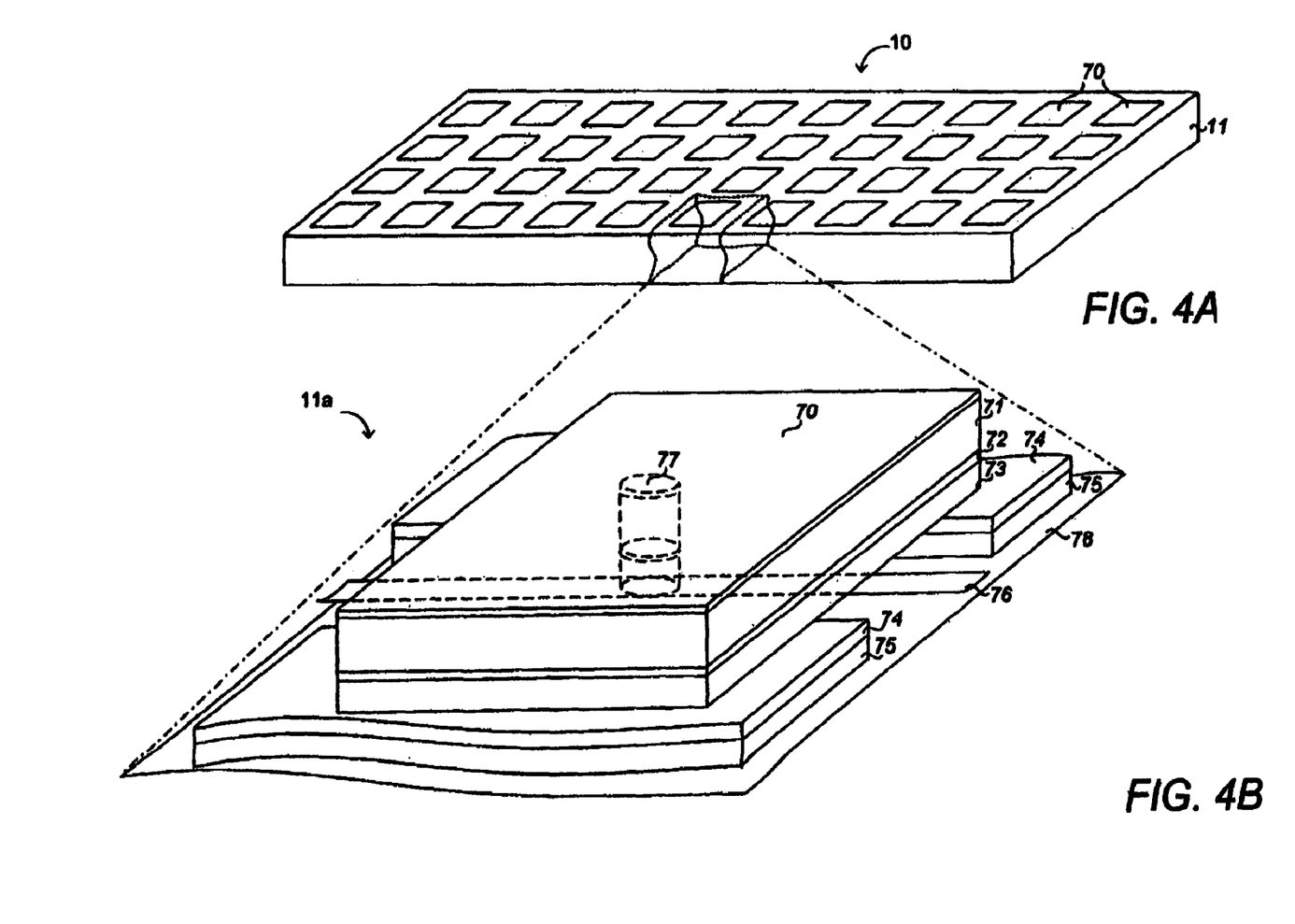
FIG. 4A is a perspective view of the capacitive encoder of FIGS. 2A and 2B.
FIG. 4B is a cross-sectional view of a portion of the capacitive encoder of FIG. 4A.

Turning now to FIG. 4A and FIG. 4B, an embodiment of capacitive encoder 11 is illustrated that supports the selection of signals A through B* for a particular capacitive element. Each conductive/capacitive element 70 is formed on a dielectric layer 71. To shield elements 70 from a driving network (discussed further with respect to FIG. 5), dielectric layer 71 overlays a ground shield 72. Ground shield 72 is separated from a feed plane 78 supporting the driving network. For example, the network may be formed using planar waveguides. For illustration clarity, only one waveguide 76 is illustrated. In a row/column arrangement of plates 70 such as shown in FIG. 4A, each row and/or column may be associated with a corresponding row or column waveguide 76. In one embodiment, the row and column waveguides may intersect and thus lie on the same plane. To carry the four signals A through B*, a separate feed plane would carry another row and column waveguide formation. Alternatively, different feed plane layers 78 may be used for each signal. Coupling between adjacent waveguides may be minimized through the incorporation of ground shields 74 in the feed plane 78 as supported by dielectric layers 75 and 73. To couple signals in waveguide 76 to plate 70, a feed contact 77 (shown in phantom) may be formed in the intervening layers.

Figure 5:
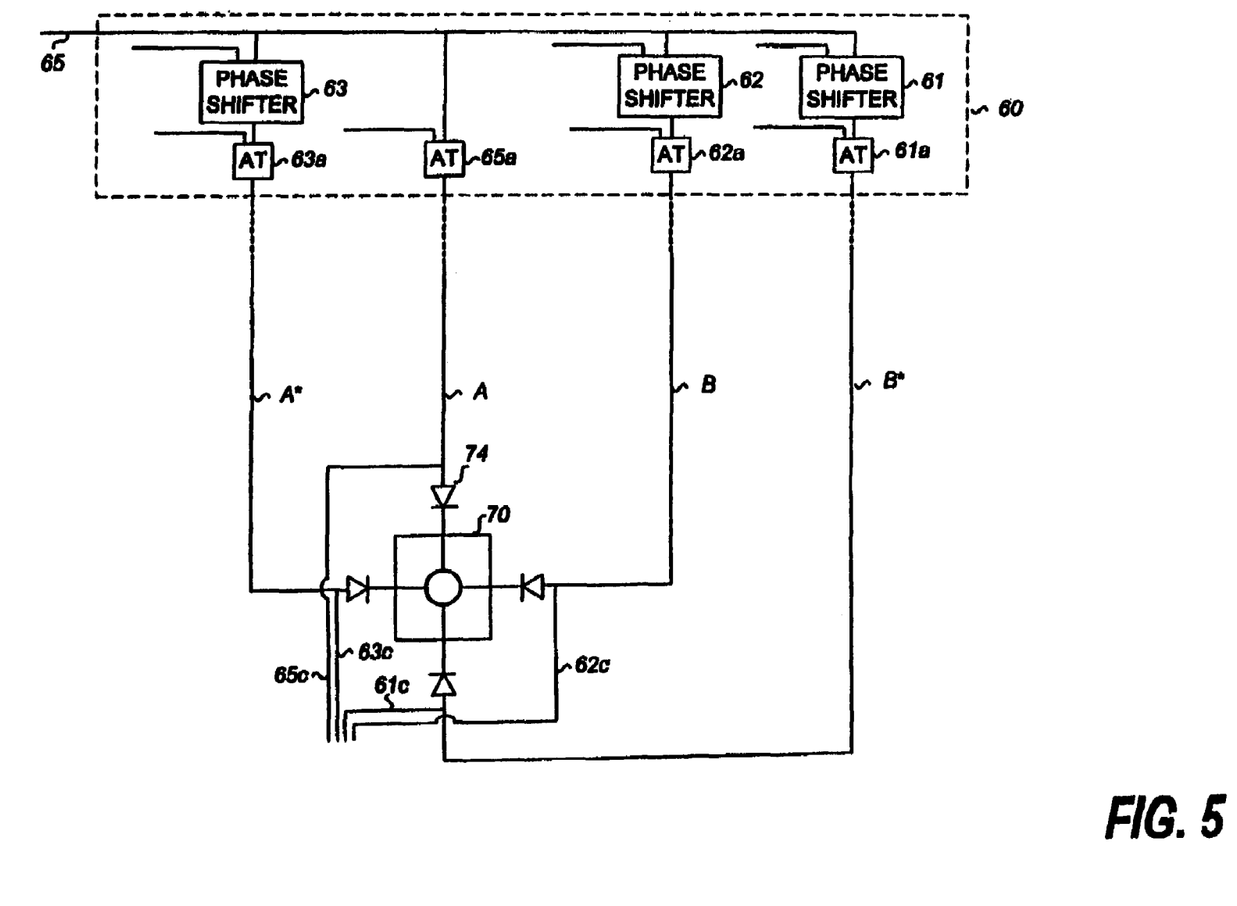
FIG. 5 is a schematic illustration of the driving network supported within the capacitive encoder of FIGS. 4A-B.

Turning now to FIG. 5, further aspects of the driving network are illustrated. As discussed previously, each capacitive element 70 may be driven with one of four available signals. To generate these signals, capacitive encoder 11 may include a programmable phase shifter subsystem 60, such as one comprising 5-bit phase shifters 61, 62 and 63 coupled to programmable attenuators 61a, 62a and 63a, respectively, and adapted to receive an operating signal 65. Operating signal 65 may be programmably attenuated in attenuator 65a to form the driving signal A as discussed previously. To generate the driving signal A* that is a desired amount out of phase with respect to signal A, the operating signal 65 may be phase-shifted by phase-shifter 63 and programmably attenuated by attenuator 63a. Similarly, operating signal 65 may be programmably phase-shifted in phase-shifters 62 and 61 and then programmably attenuated in attenuators 62a and 61a to form nullifying signals B and B*. Signals A, A*, B, and B* may be coupled through conductors such as waveguide 76 to a selected element 70 via feed contact 77. For example, to select an element 70, a corresponding switch such as a diode 74 may be driven into a conductive state. In contrast to the generation of signals B and B*, there is no intrinsic need to attenuate signals A and A*. However, the inclusion of attenuators 63a and 65a allows a user to tune the amount of power being supplied to signals A and A* such that only a sufficient amount of power is used to encode RFID tag 2.

As also shown in FIG. 5, the operating signal 65 is phase-shifted by phase-shifter 62 and attenuated by attenuator 62a into a signal B that has a phase and amplitude relationship to A as described above. In addition, operating signal 65 is also inputted into phase shifters 61, and 63 for phase-shifting by a predetermined phase angle and attenuated by attenuators 63a and 61a into signals B* and A*, respectively. In another exemplary embodiment, the programmable grid antenna subsystem is operable to receive an inputted phase, such as a predetermined phase inputted by a user.

Figure 6:
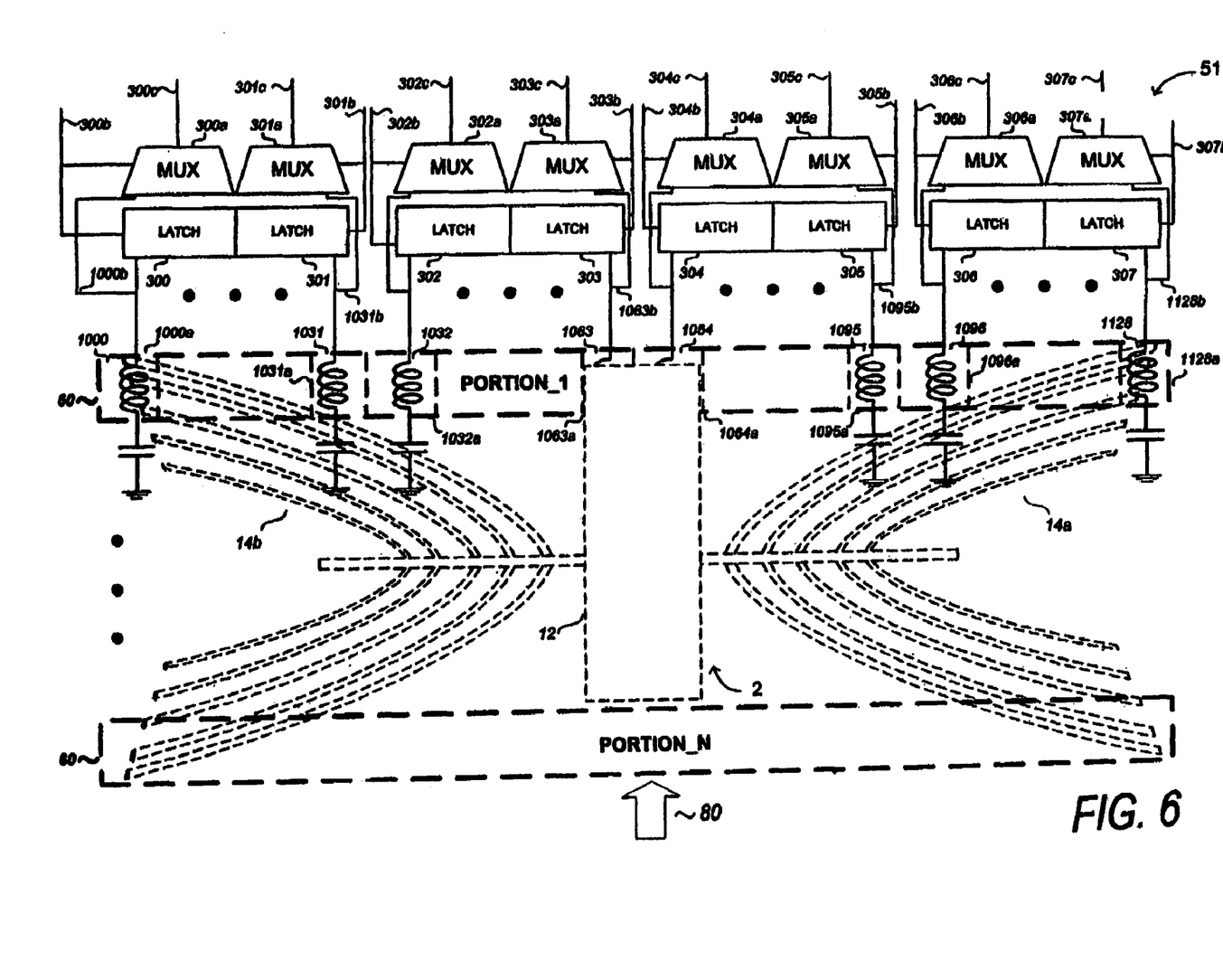
FIG. 6 is a schematic illustration of an RFID tag imager in accordance with an embodiment of the invention.

As discussed previously, the phase and amplitude relationship of nullifying signals B and B* to corresponding encoding signals A and A* depends upon the electromagnetic modeling which in turn depends upon the imaging provided by RFID tag imager 50. RFID tag imager 50 may be constructed using either an optical or inductive sensor(s). An inductive embodiment of RFID tag imager 50 is illustrated in FIG. 6. As shown in FIG. 6, an inductor array subsystem 51 comprises an exemplary array of 128 inductors, such as inductors 1000-1128 juxtaposed in a linear formation. In that regard, each inductor corresponds to a pixel of the portion 60 being imaged as discussed with respect to FIG. 1. It will thus be appreciated that the dimensions of inductors 128 determine the pixel size and hence the resolution of the resulting image. The necessary resolution in turn depends upon the conductor width and layout complexity of the tag antenna 14. In one embodiment, the pixel size is approximately 0.3 mm. Each of inductors 1000-1128 is operable to generate a corresponding induction field, such as induction fields 1000a-1128a corresponding to inductors 1000-1128, respectively. For illustration clarity, only a subset of the inductors 1000-1128 and their corresponding induction fields 1000a-1128a are shown in FIG. 6. As shown in FIG. 6, an RFID tag 2 (shown in phantom) is placed in proximity of the RFID tag imager 50, such as under the RFID tag imager 50. The presence of each metallic part in the RFID tag 2 is then "felt" by each inductor via a change in a frequency pattern of the affected inductor, such as inductor 1000 whose induction field 1000a is affected by a metallic part of antenna wing 14b. A signal representing the change in the frequency pattern of an affected inductor, such as inductor 1000, is then transmitted from the affected inductor via one of the transmission lines 1000b-1128b corresponding to the inductors 1000-1128, respectively, such as via transmission line 1000b corresponding to inductor 1000.

In an exemplary embodiment of the present invention, to reduce a detrimental overlapping of induction fields of adjacent inductors, such as overlapping of induction fields 1031a and 1032a of adjacent inductors 1031 and 1032, inductors 1000-1128 are made operational in a predetermined on/off pattern so that adjacent inductors are not operational at the same time. In the exemplary embodiment of FIG. 6, every $32^{nd}$ inductor in the inductors 1000-1128 is made operational at a given time, such as for example first making inductors 1000, 1032, 1064, and 1096 operational and then powered down before moving to a different set of inductors, such as to inductor 1031, 1063, 1095 and 1128, and repeating the process until all the inductors 1000-1128 have been made operational at one point in the foregoing pattern. By applying this pattern in rapid succession to each inductor set in the inductors 1000-1128, a virtual line scan of the affected inductors is obtained while minimizing the risk of detrimental overlapping of induction fields of adjacent inductors.

As shown in FIG. 6, in an exemplary implementation of the above-described pattern, a set of latches 300-307 are used for regulating the application of operating power to the inductors 1000-1128. In the exemplary embodiment shown in FIG. 6, latches 300-307 are 16 bit latches, each controlling a subset of sixteen inductors. A set of multiplexers 300a-307a adapted to receive a subset of sixteen of transmission lines 1000b-1128b are also used to reduce the total number of transmission lines exiting the inductor array subsystem 11, since at any give time only a subset of the inductors 1000-1128 are made operational and thus only a corresponding subset of the transmission lines 1000b-1128b are in use. As also shown in FIG. 6, each of latches 300-307 is paired to a respective one of multiplexers 300a-307a, via a respective one of control lines 300b-307b such that for example when latch 300 is instructed by control line 300b to provide operating power to inductor 1000, the multiplexer 300a is also instructed by control line 300b to select transmission line 1000b so to output the signal received from inductor 1000.

Figure 7:
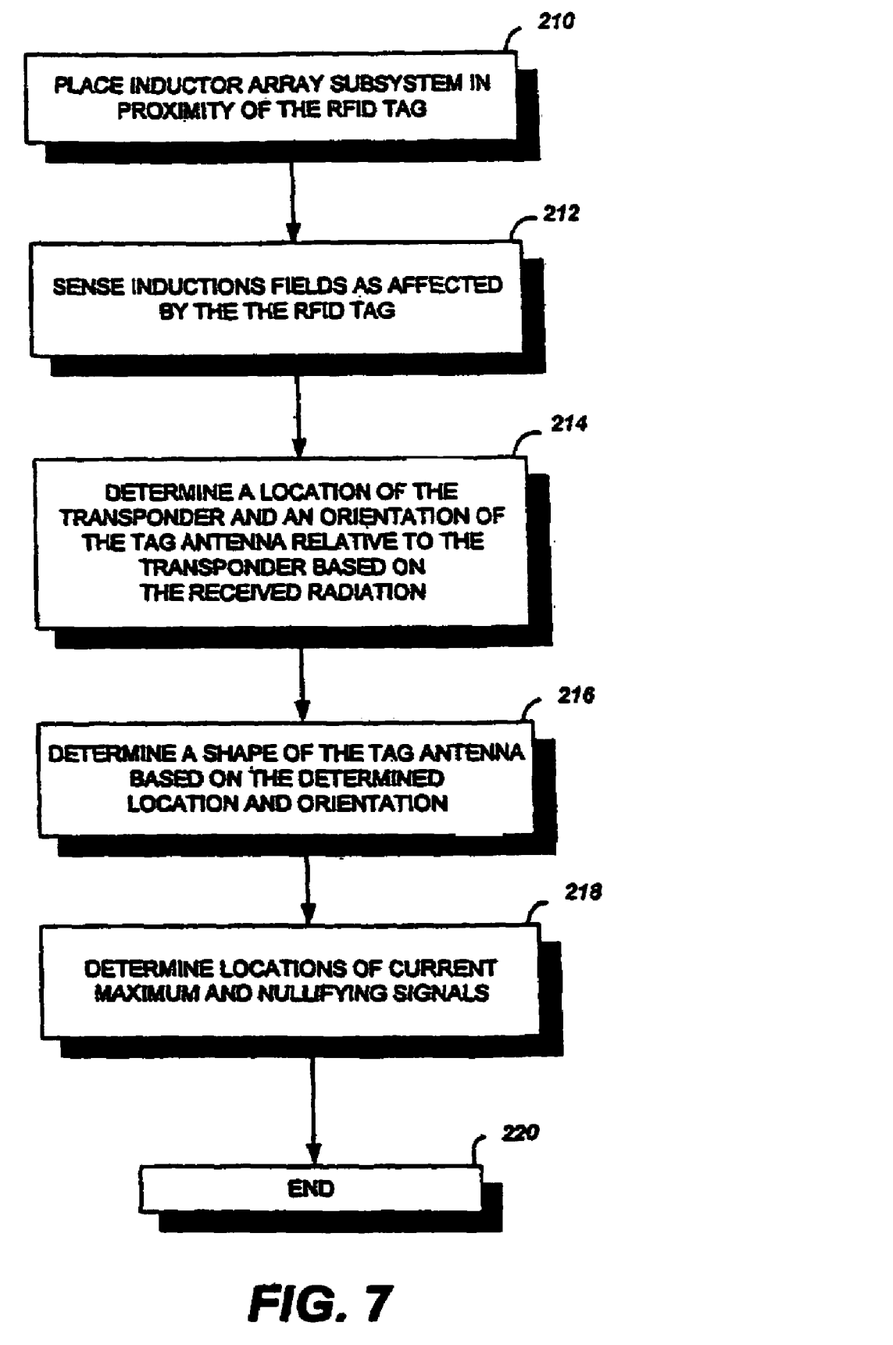
FIG. 7 is a flow diagram illustrating a method of imaging an RFID tag in accordance with an embodiment of the invention.

Operation of RFID tag imager 50 may be better understood with reference to the flowchart of FIG. 7. As shown in FIG. 7, the process begins in block 210 where the inductor array subsystem 51 is placed in proximity of the RFID tag 2, such at a distance above the RFID tag 2. Next, in block 212, the inductions fields as affected by the metal within the RFID tag 2 are sensed. Next, in block 214, a location of the transponder 12 and an orientation 15 of the tag antenna 14 relative to the transponder 12 is determined by the microprocessor 29 based on the data received from the imager 11 such as respective outputs 300c-307c of multiplexers 300a-307a comprising signals representing the change in the frequency pattern of affected inductors 1000-1128. In an exemplary embodiment of the present invention, the orientation of the tag antenna 14 relative to the transponder 12 is determined based on a set of predetermined axes, such as in respect to predetermined assembly-line representations of x-axis and y-axis in a Cartesian coordinate system. Next, in block 216, a shape of the tag antenna 14 is determined based on the location of the transponder 12 and orientation of the tag antenna 14 relative to the transponder 12, as previously determined in block 214.

The flow then proceeds to block 218, in which based on the shape of the RFID tag 2 determined in block 216, the locations of current maximums, such as corresponding to plates 70a and 70b in FIGS. 2A and 2B, are determined using electromagnetic modeling. In addition, the phase and amplitude relationship for the nullifying signals B and B* are also determined as well as the corresponding locations 92 where the nullifying signals should be applied are determined in block 218. It will be appreciated that processor 29 may store the electromagnetic models of expected RFID tags. Based upon the imaging data provided by RFID tag imager 50, processor 29 then merely needs to recall the electromagnetic data for the recognized RFID tag 2 in order to perform the operations described in block 218. The flow then proceeds to block 220 in which the overall process ends.

It will be appreciated that system 1 may also image and encode RFID tags using patch antennas rather than dipoles. Moreover, should a user know with confidence the type of RFID tag antenna and its orientation on the roll, there would be no need to have a selectable system of conductive elements as discussed above. For example, with respect to FIG. 2a, the capacitive encoder need only include elements 70a and 70b for the specific orientation of RFID antenna 14. Should a selectable plurality of conductive elements be used such as discussed with regard to FIG. 2a, these elements need not be arranged in a regular fashion but may also be arranged irregularly—for example, more elements may be provided in areas that are expected to correspond to likely current maximums on the corresponding RFID tag antennas.

Should a user be assured that the same type of RFID tag will be periodically encoded, there would be no need for RFID tag imager 50 discussed with regard to FIG. 1. Instead, the orientation and topology of the RFID antenna being encoded would be known such that RFID tag imager 50 would be redundant. Because the orientation and topology is already known, the electromagnetic modeling discussed herein could be performed off-line to determine the corresponding areas of relatively high current density. A corresponding conductive element would then be located in the encoder to be proximate these areas of relatively high current concentration. Alternatively, the electromagnetic modeling could be disregarded such that the areas of high current density are assumed to simply correspond to symmetrically placed locations for each dipole half or wing. For example, with respect to the dipole antenna 14 shown in FIG. 2a, capacitive encoder 11 need only include capacitive elements 70a and 70b. The remaining elements would be superfluous with respect to encoding because the orientation and topology of RFID antennas 14 would not change on a roll 3 of known RFID tags.

Figure 8A:
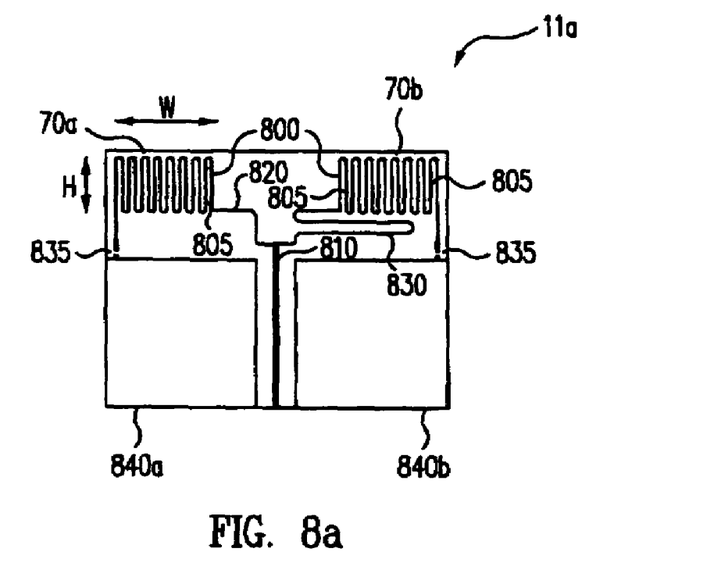
FIG. 8a is a plan view of a stripline capacitive RFID encoder in accordance with an embodiment of the invention.

Turning now to FIG. 8a, a particularly advantageous embodiment for capacitive elements 70a and 70b is illustrated for a capacitive encoder 11a. As just discussed, it is assumed for capacitive encoder 11a that the orientation and type of RFID tag that will be near field encoded is known such that only elements 70a and 70b are necessary. Each capacitive element 70*a* and 70*b* comprises a meandering stripline. For example, capacitive element 70*a* includes opposing stripline portions 800 and 805. Because this stripline portions run in opposing directions, the magnetic fields they excite are cancelled such that portions 800 and 805 appear as a resistive and capacitive load. To excite stripline portions 800 and 805, an RF signal is coupled to a feed stripline 810. A connector stripline 820 couples the RF excitation on feed stripline 810 to stripline portions 800 and 805. A connector stripline 830 that couples the RF excitation on feed stripline 810 to stripline portions 800 and 805 in capacitive element 70*b* is extended with respect to connector stripline 820 so as to induce the desired phase shift between the excitations to elements 70*a* and 70*b*. *It will be appreciated that the term "stripline" is being used in a non-standard fashion in that a more technical description of the conductors forming capacitive elements 70*a* and 70*b* would be "microstrip" conductors.*

Figure 8B:
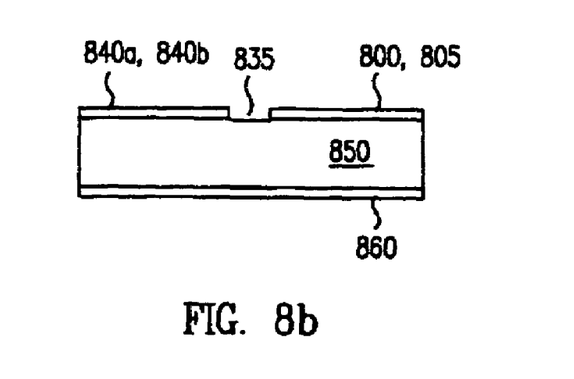

Each stripline capacitive element 70*a* and 70*b* is separated by a gap 835 from respective ground plates 840*a* and 840*b*. Ground plates 840*a* and 840*b* are optional as they simply function to provide better shielding to feed stripline 810. As seen in the cross-sectional view of FIG. 8*b*, stripline capacitive elements 800 and 805 as well as ground plates 840*a* and 840*b* are separated by a dielectric substrate 850 from ground plane 860. Referring back to FIG. 8*a*, the thickness of dielectric substrate 850 determines a desired minimum separation between opposing stripline portions 800 and 805. For example, suppose the width for each stripline portion 800 and 805 is such that each portion has a characteristic impedance of 100 Ω. As the separation between opposing stripline portions 800 and 805 is reduced, this characteristic impedance would be affected—clearly, as the separation goes to zero, the characteristic impedance would be that of a capacitive plate in that the stripline portions would merge into a solid plate. Thus, by keeping the minimum separation between opposing stripline portions to be at least the thickness of dielectric substrate 850, the characteristic impedance is maintained at a desired level. As illustrated, opposing stripline portions 800 and 805 are arranged in parallel such that current through these portions alternate in direction by 180 degrees. For example, if the portions are assumed to be parallel to the z direction, the current alternates from the +z to the −z direction and vice versa. In this fashion, a magnetic field excited by a portion having current in the +z direction is substantially cancelled by the current flowing through an adjacent portion in the −z direction. It will be appreciated that these advantages may also be obtained using alternative arrangements of stripline portions. For example, a zig-zag or fractal pattern may be used to construct a stripline capacitive element.

Note the advantages of using opposing stripline portions 800 and 805 to form stripline capacitive elements 70*a* and 70*b*. For example, consider the case should stripline portions 800 and 805 be replaced by a corresponding solid conductive plate that covers the same height H and width W such as shown for element 70*a*. Because a conductive plate will have a much lower resistance than stripline connectors 820 and 830, there would be a significant impedance mismatch that would reduce the amount of power that could be coupled into the conductive plate. This same mismatch would occur should via feeds be used as discussed with respect to FIGS. 4*a* and 4*b*. Thus, a capacitive encoder that incorporates capacitive elements 70 formed from opposing stripline portions will require less power than an equivalent encoder that uses plates. Moreover, because of the poor power transfer in a capacitive plate system (resulting from the impedance mismatches), the dielectric thickness for such systems must be substantially greater to achieve the same encoding power. In contrast, dielectric substrate 850 may be relatively thin, for example, a thickness of 32 mils, which lowers manufacturing costs. In addition, the use of stripline leads to a natural impedance matching—for example, feed stripline 810 may have a width to produce a desired characteristic impedance such as 50 Ω. Connector stripline portions 830 and 820 may then have one-half the width used for feed stripline 810 to provide a characteristic impedance of 100 Ω. Because connector stripline portions 830 and 820 are in parallel with respect to ground, their effective impedance with respect to feed stripline 810 is still 50 Ω, thus providing a matched feed. In turn, opposing stripline portions 800 and 805 may simply have the same width (and thus same characteristic impedance) as connector stripline portions 830 and 820. These same advantages may be provided in an array of elements 70 such as described for capacitive encoder 11 of FIG. 1. As seen in FIGS. 4*a* and 4*b*, stripline portions 800 and 805 would then be via fed making ground plates 840*a* and 840 superfluous since there would be no feed stripline to shield. Advantageously, because of the enhanced near field coupling provided by the use of stripline capacitive elements 70*a* and 70*b*, the need for the use of an array (vs just two elements) is reduced regardless of the RFID tag type. In other words, the proper combination of two stripline capacitive elements will encode many types of RFID tags, thereby obviating the need for an array of such elements.

The fixed length of stripline connector portion 830 introduces a fixed phase shift for the RF excitation of element 70*b* as compared to the RF excitation of element 70*a*. This fixed phase shift will change as the RF excitation frequency is changed. Because of the excellent matching that may be obtained in a meandering stripline embodiment such as discussed for FIGS. 8*a* and 8*b*, the voltage standing wave ratio (VSWR) on feed stripline 810 (or an RF feed that couples to feed stripline 810) will be close to unity. In particular, the VSWR will be closest to unity at the resonant frequency for the corresponding RFID tag that is being near field (capacitively) encoded. Because of this excellent VSWR performance, the VSWR behavior as a function of frequency may be used to classify the performance of a given RFID tag. However, the VSWR at a given frequency will also depend upon the relative phase shift between the stripline capacitive elements 70*a* and 70*b*. The fixed phase shift provided by stripline connector 830 may thus be sub-optimal for a given frequency.

Figure 9:
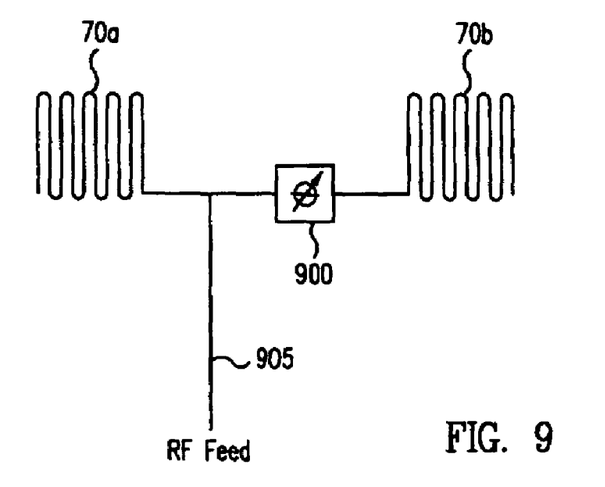
FIG. 9 is a block diagram of a stripline capacitive RFID encoder including a variable phase shifter in accordance with an embodiment of the invention.

To determine the optimal phase shift (with respect to VSWR) for a given frequency, a variable phase shifter 900 may be used to determine the phase shift for stripline capacitive element 70*b* as seen in FIG. 9. The frequency may thus be varied across a desired frequency range in increments such that the optimal phase shift for phase shifter 900 can be determined at each frequency increment with respect to a VSWR measured on an RF feed 905. In this fashion, with respect to a given RFID tag type being encoded, the proper phase shift as a function of frequency may be determined.

Figure 10:
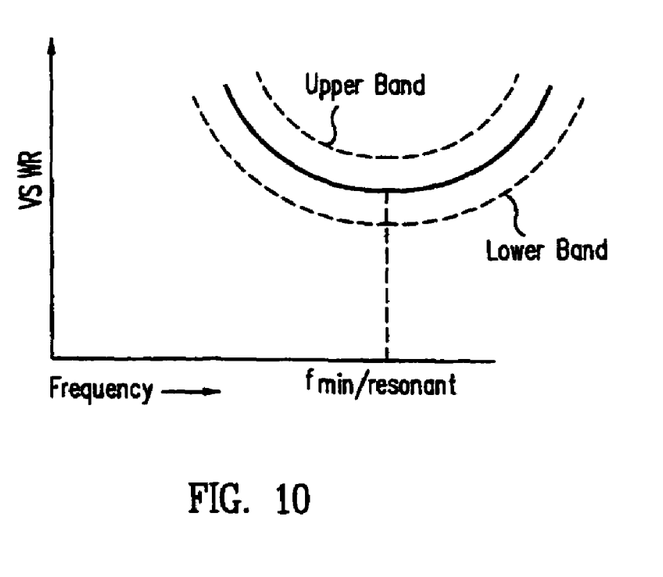
FIG. 10 is a graph of VSWR vs. frequency in accordance with an embodiment of the invention.

Having determined the proper phase shift as a function of frequency, the VSWR behavior as a function of frequency for an exemplary RFID tag may be measured as illustrated in FIG. 10. As the frequency of the RF excitation is changed, the proper phase shift is introduced by variable phase shifter 900. Alternatively, a fixed phase shift may be used as discussed with respect to FIG. 8*a* if sub-optimal VSWR behavior is acceptable. As seen in FIG. 10, the VSWR drops to a minimum corresponding to a frequency $f_{min}$, which may also be denoted as $f_{resonant}$ since it corresponds to the resonant frequency of the RFID tag being encoded.

The VSWR behavior may be used to classify an RFID tag. For example, for a given RFID tag type, an upper bound and lower bound VSWR performance may be determined as illustrated in FIG. 10. A particular RFID tag may be classified as acceptable if its VSWR performance is within these bounds. Alternatively, a particular RFID tag may be deemed acceptable if its VSWR performance is within the upper bound only. The VSWR tests just described determine whether an RFID tag has been manufactured properly. Rather than know if a particular RFID tag is normal for its class, a user may want to determine if a particular RFID tag type is suitable for a desired application. For example, a user may have RFID interrogators designed to operate at a certain frequency. The VSWR performance may be analyzed to determine whether $f_{min}$ is suitably close to this interrogation frequency.

The VSWR analysis just described may be performed manually or may be automated using a processor or logic engine. Although the superior matching performance of a stripline design enhances this VSWR analysis for tag classification, it will be appreciated that this analysis may be implemented using other capacitive element topologies.

A meandering stripline embodiment not only enhances stripline design, it also enhances a non-resonant excitation. For example, a 900 MHz RFID tag's antenna will be designed to have a resonant frequency at approximately 900 MHz. Should an interrogator excite such a tag with a far field RF signal having a frequency of 2.5 GHz, the tag simply will not respond. However, because a capacitive encoder excites the RFID tag in the near field, the RF signal driven, for example, into feed stripline 810 or RF feed 905 need not be at the resonant frequency of the corresponding RFID tag being near field encoded. Instead, the RF signal used to capacitively excite the RFID tag may have a frequency relatively far removed from the tag's resonant frequency. For example, a 900 MHz tag may be near field encoded using, for example, a 60 MHz RF signal. By using such non-resonant excitation frequencies, the likelihood of RF radiation from the near-field-excited tag is greatly diminished. In this fashion, a capacitive encoder need not nullify RF radiation from the near-field-excited tag as described above.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A capacitive RFID tag encoder, comprising:
a substrate;
a ground plane on a first surface of the substrate;
a first plurality of serially-connected stripline conductors on a second surface of the substrate, the serially-connected stripline conductors in the first plurality being arranged within a first area of the second surface,
a second plurality of serially-connected stripline conductors on the second surface of the substrate, the serially-connected stripline conductors in the second plurality being arranged within a second area of the second surface, the encoder being configured to drive the first plurality of serially-connected stripline conductors with an RF signal and to drive the second plurality of serially-connected stripline conductors with a phase-shifted version of the RF signal.

2. The capacitive encoder of claim 1, wherein each of the stripline conductors in the first and second plurality is arranged in parallel with the remaining stripline conductors.

3. The capacitive encoder of claim 1, wherein the first and second plurality of stripline conductors are each arranged in a fractal pattern.

4. The capacitive encoder of claim 1, further comprising:
a stripline feed on the second surface for receiving the RF signal;
a first connector stripline connecting the stripline feed to the first plurality of stripline conductors so that the first plurality of stripline conductors is driven with the RF signal; and
a second connector stripline connecting the stripline feed to the second plurality of stripline conductors, wherein the second connector stripline has a different length than the first connector stripline so that the second plurality of stripline conductors is driven with the phase-shifted version of the RF signal.

5. The capacitive encoder of claim 4, further comprising a variable phase shifter for providing the phase-shifted version of the RF signal.

6. The capacitive encoder of claim 1, wherein a spacing between each of the stripline conductors in the first plurality is at least as large as a thickness of the substrate, and wherein a spacing between each of the stripline conductors in the second plurality is at least as large as the thickness of the substrate.

7. The capacitive encoder of claim 1, wherein a characteristic impedance for the stripline conductors in the first and second plurality is at least 50 Ω.

8. A capacitive RFID tag encoder, comprising:
a substrate; and
a plurality of capacitive elements on the substrate, each capacitive element including a plurality of serially-connected stripline conductors, the encoder being configured to drive a first selected one of the capacitive elements with an RF signal and to drive a second selected one of the capacitive elements with a phase-shifted version of the RF signal.

9. The capacitive RFID tag encoder of claim 8, further comprising:
a processor configured to select the first and second selected ones of the capacitive elements based upon an orientation of an RFID tag.

10. The capacitive RFID tag encoder of claim 9, further comprising:
an RFID tag imager operable to provide the orientation of the RFID tag to the processor.

11. The capacitive RFID tag encoder of claim 9, each of the stripline conductors is arranged in parallel with the remaining stripline conductors.

12. A capacitive RFID tag encoder, comprising: a substrate;
a ground plane on a first surface of the substrate;
a first plurality of serially-connected conductors on a second surface of the substrate, the serially-connected conductors in the first plurality being arranged in an alternating fashion within a first area of the second surface such the first plurality of serially-connected conductors presents a substantially resistive and capacitive load to an import port coupled to the first plurality of serially-connected conductors through a first feed conductor;

a second plurality of serially-connected conductors on the second surface of the substrate, the serially-connected conductors in the second plurality being arranged in an alternating fashion within a second area of the second surface such the second plurality of serially-connected conductors presents a substantially resistive and capacitive load to the import port coupled to the second plurality of serially-connected conductors through a second feed conductor, the encoder being configured to drive the input port with an RF signal, wherein an electrical length for the first feed conductor is different than an electrical length of the second feed conductor.

13. The capacitive encoder of claim 12, wherein each of the conductors in the first and second plurality is arranged in parallel with the remaining conductors.

14. The capacitive encoder of claim 12, wherein the first and second plurality of conductors are each arranged in a fractal pattern.

15. The capacitive encoder of claim 12, wherein a spacing between each of the conductors in the first plurality is at least as large as a thickness of the substrate, and wherein a spacing between each of the conductors in the second plurality is at least as large as the thickness of the substrate.

16. The capacitive encoder of claim 12, wherein a characteristic impedance for the conductors in the first and second plurality is at least 50 Ω.

* * * * *